US012766497B2

(12) United States Patent
Koseoglu

(10) Patent No.: US 12,766,497 B2
(45) Date of Patent: Oct. 20, 2026

(54) INTEGRATED CATALYST/ADSORBENT MANUFACTURING PROCESS FREE OF $CO_2$ EMISSIONS

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 793 days.

(21) Appl. No.: 18/334,915

(22) Filed: Jun. 14, 2023

(65) Prior Publication Data

US 2024/0416334 A1 Dec. 19, 2024

(51) Int. Cl.
*B01J 37/34* (2006.01)
*B01J 20/18* (2006.01)
(Continued)

(52) U.S. Cl.
CPC ........... *B01J 37/342* (2013.01); *B01J 20/183* (2013.01); *B01J 20/3042* (2013.01);
(Continued)

(58) Field of Classification Search
CPC .... B01J 37/342; B01J 20/183; B01J 20/3042; B01J 20/3078; B01J 20/3085; B01J 20/3204; B01J 20/3236; B01J 29/061; B01J 37/0201; B01J 37/031; B01J 37/088; B01J 23/42; B01J 23/63; B01J 23/6567; B01J 21/04; B01J 35/31; B01J 35/60; B01J 35/633; B01J 8/02; C01B 3/12; C01B 2203/0283; C01B 2203/061; C01B 3/16; C01B 3/38; C01B 3/386; C01B 2203/0227; C01B 2203/0261; C01B 2203/066; C01B 2203/0811; C01B 2203/1005;
(Continued)

(56) References Cited

U.S. PATENT DOCUMENTS 4,994,428 A * 2/1991 Bell ......................... B01J 37/16
502/330
7,608,743 B2 10/2009 Olah et al.
(Continued)

*Primary Examiner* — Xiuyu Tai
(74) *Attorney, Agent, or Firm* — Dinsmore & Shohl LLP

(57) ABSTRACT

An integrated catalyst/adsorbent manufacturing process. The process includes generating electrical energy from a green energy source and providing the electrical energy to operate an electrolyzer, a steam generation unit, and a catalyst/adsorbent manufacturing unit. The electrolyzer operates to generate a hydrogen stream and an oxygen stream from electrolysis of a first stream of water and the steam generation unit operates by burning the hydrogen in the steam generation unit to generate heat to convert a second stream of water into steam. The catalyst/adsorbent manufacturing unit operates to produce the catalyst/adsorbent from the electrical energy, the steam, the hydrogen, the oxygen, and catalyst/adsorbent precursor chemicals provided to the catalyst/adsorbent manufacturing unit. Finally, the process includes capturing a carbon dioxide stream generated as a by-product of production of the catalyst/adsorbent in the catalyst/adsorbent manufacturing unit to generate the catalyst/adsorbent without $CO_2$ emissions.

20 Claims, 4 Drawing Sheets

(51) Int. Cl.

| | |
|---|---|
| ***B01J 20/30*** | (2006.01) |
| ***B01J 20/32*** | (2006.01) |
| ***B01J 29/06*** | (2006.01) |
| ***B01J 37/02*** | (2006.01) |
| ***B01J 37/03*** | (2006.01) |
| ***B01J 37/08*** | (2006.01) |
| ***C01B 3/12*** | (2006.01) |

(52) U.S. Cl.
CPC ....... *B01J 20/3078* (2013.01); *B01J 20/3085* (2013.01); *B01J 20/3204* (2013.01); *B01J 20/3236* (2013.01); *B01J 29/061* (2013.01); *B01J 37/0201* (2013.01); *B01J 37/031* (2013.01); *B01J 37/088* (2013.01); *C01B 3/12* (2013.01); *C01B 2203/0283* (2013.01); *C01B 2203/061* (2013.01)

(58) Field of Classification Search
CPC .... C01B 2203/1023; C01B 2203/1029; C01B 2203/1041; C01B 2203/1064; C01B 2203/107; C01B 2203/1082; C01B 2203/1247; C01B 2203/1604; C01B 2203/1609; C01B 17/021; C01B 3/22; C01B 2203/0266; C01B 2203/0465; C01B 7/07; C01B 2203/04; C01B 2203/062; C01B 2203/0485; C01B 2203/0894; C01B 2203/0415; C01B 32/40; C01B 2203/068; C10J 3/00; C10J 2300/1606; C10J 3/20; C10J 2300/0946; C10J 2300/1292; C10J 2300/1659; C10J 2300/1807; C10J 2300/1618; C10J 2300/1684; C10J 2300/1238; C10J 2300/1678; C25B 1/04; C25B 15/081; C25B 1/02; C25B 9/00; C10K 1/004; C10K 1/122; C10K 1/028; C10K 1/024; C10K 1/005; B09B 3/45; B09B 2101/65; Y02E 60/36; B01D 53/02; C01C 1/04; C07C 27/04; C10G 2/30; C10G 2/50; C10L 3/08; F25J 3/04533; F25J 3/04539; F25J 3/04545; F25J 3/04836; F25J 3/04842; F25J 2260/30; F25J 2260/80; Y02C 20/40; Y02P 20/133; Y02P 20/52; Y02P 20/151
See application file for complete search history.

(56) References Cited

U.S. PATENT DOCUMENTS

| | | | | |
|---|---|---|---|---|
| 11,433,381 | B1 | 9/2022 | Khan et al. | |
| 2015/0232999 | A1 * | 8/2015 | Busskamp | ................ C25B 1/02 205/637 |

* cited by examiner

INTEGRATED CATALYST/ADSORBENT MANUFACTURING PROCESS FREE OF $CO_2$ EMISSIONS

BACKGROUND

Field

Embodiments of the present disclosure generally relate to a catalyst/adsorbent manufacturing process and, more specifically relate to a green catalyst/adsorbent manufacturing process utilizing green electricity to product the catalyst/adsorbent with no carbon dioxide emissions.

Technical Background

Production of catalysts/adsorbents utilized in various chemical production and refining operations is an energy intensive process. For example, such manufacturing processes require large amounts of electricity to operate the production plants, generation of large volumes of steam, and injection of significant thermal energy to produce the catalysts/adsorbents. Typically the electricity is produced by fossil fuel based power stations, the steam is generated by burning hydrocarbon fuels such as natural gas, and heating steps in the catalyst/adsorbent manufacturing process are typically achieved by also burning hydrocarbon fuels such as natural gas. Each of these unit operations results in the generation and ultimate release of a significant amount of carbon dioxide into the atmosphere. Given the present trend and societal initiative to reduce environmental harm and carbon dioxide emissions production of catalysts/adsorbents for utilization in various chemical production and refining operations without the commensurate carbon dioxide release is desirable.

Accordingly, ongoing needs exists for catalyst/adsorbent manufacturing processes that reduce or eliminate carbon dioxide emissions.

SUMMARY

Embodiments of the present disclosure are directed to integrated catalyst/adsorbent manufacturing process which reduces or eliminates carbon dioxide emission by operating in an environmentally efficient and desirable manner on multiple fronts. The processes in accordance with the present disclosure operate utilizing electrical energy from green energy sources to eliminate the vast quantity of $CO_2$ emissions resulting from the burning of fossil fuels to generate electricity. Additionally, processes in accordance with the present disclosure operate to generate hydrogen and oxygen through electrolysis of water using the green energy for later utilization in the synthesis of the catalyst/adsorbents. Such processing flow with green hydrogen being used as the fuel to provide heating for steam generation and heating within the catalyst/adsorbent synthesis process eliminates the vast $CO_2$ emissions from the burning of natural gas or other hydrocarbons. Further, any $CO_2$ generated as a result of the synthesis of catalyst/adsorbent in accordance with the presently disclosed process is further captured and sequestered or converted into value-added chemicals to result in no ultimate $CO_2$ emissions into the atmosphere.

According to one embodiment, an integrated catalyst/adsorbent manufacturing process is provided. The process comprises generating electrical energy from a green energy source, providing a first stream of water to an electrolyzer, providing the electrical energy generated from the green energy source to the electrolyzer, and operating the electrolyzer to generate a hydrogen stream and an oxygen stream from electrolysis of the first stream of water. Further, the process comprises providing a second stream of water to a steam generation unit, providing at least a portion of the hydrogen stream generated in the electrolyzer to the steam generation unit, and operating the steam generation unit by burning the hydrogen in the steam generation unit to generate heat to convert the second stream of water into steam. Additionally, the process comprises providing at least a portion of the hydrogen stream generated in the electrolyzer, at least a portion of the oxygen stream generated in the electrolyzer, and at least a portion of the steam generated in the steam generation unit to a catalyst/adsorbent manufacturing unit, providing catalyst/adsorbent precursor chemicals to the catalyst/adsorbent manufacturing unit, providing the electrical energy generated from the green energy source to the catalyst/adsorbent manufacturing unit, and operating the catalyst/adsorbent manufacturing unit to produce the catalyst/adsorbent from the electrical energy, the steam, the hydrogen, the oxygen, and the catalyst/adsorbent precursor chemicals. Finally, the process comprises capturing a carbon dioxide stream generated as a by-product of production of the catalyst/adsorbent in the catalyst/adsorbent manufacturing unit.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of the integrated catalyst manufacturing process of the present disclosure. Though the systems and process flow charts for the integrated catalyst manufacturing process of FIGS. 1, 2, and 3 are provided as exemplary, it should be understood that the present systems and process flows encompass other configurations.

Figure 1:
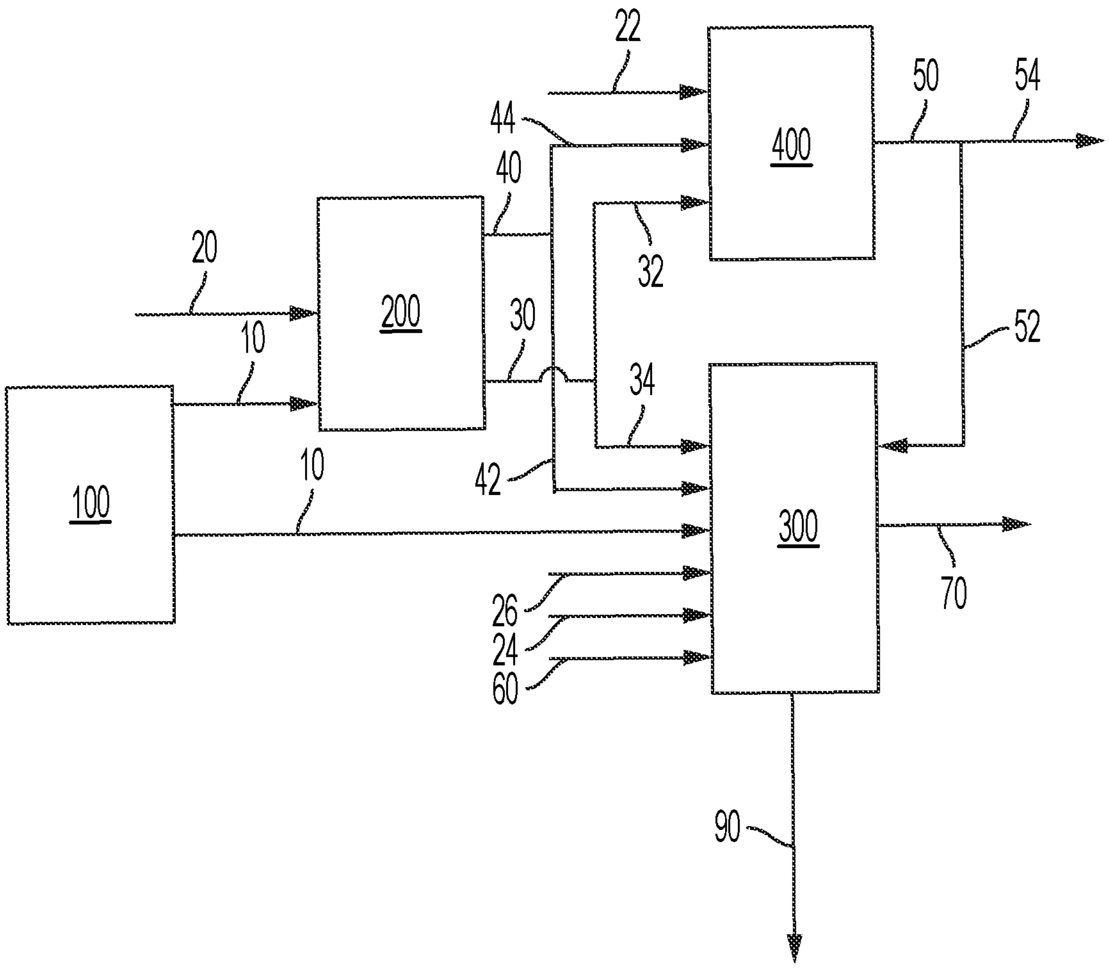
FIG. 1 is a flow chart of an integrated catalyst manufacturing process with $CO_2$ sequestration in accordance with one or more embodiments of the present disclosure.
Figure 2:
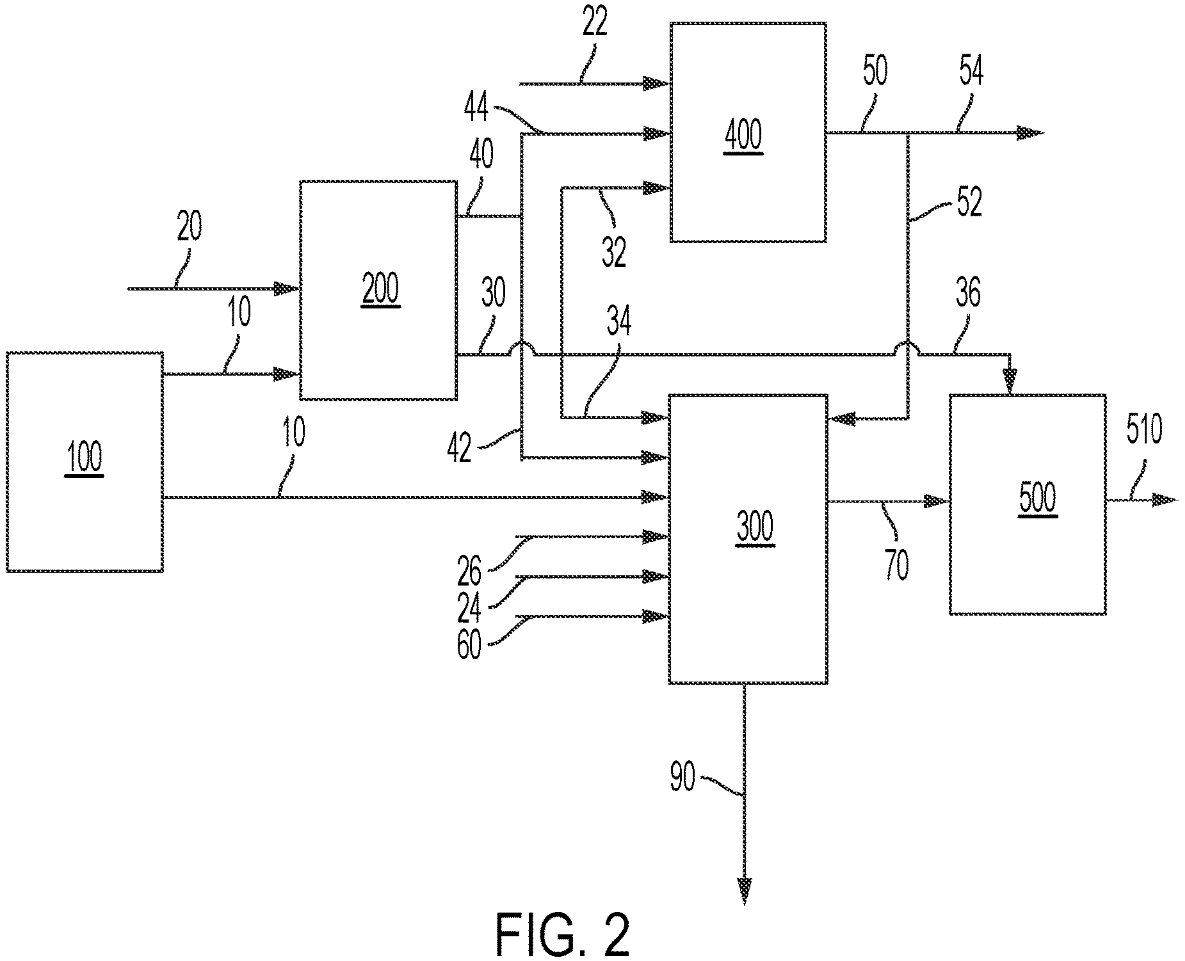
FIG. 2 is a flow chart of an integrated catalyst manufacturing process with conversion of $CO_2$ to value-added chemicals in accordance with one or more embodiments of the present disclosure.
Figure 3:
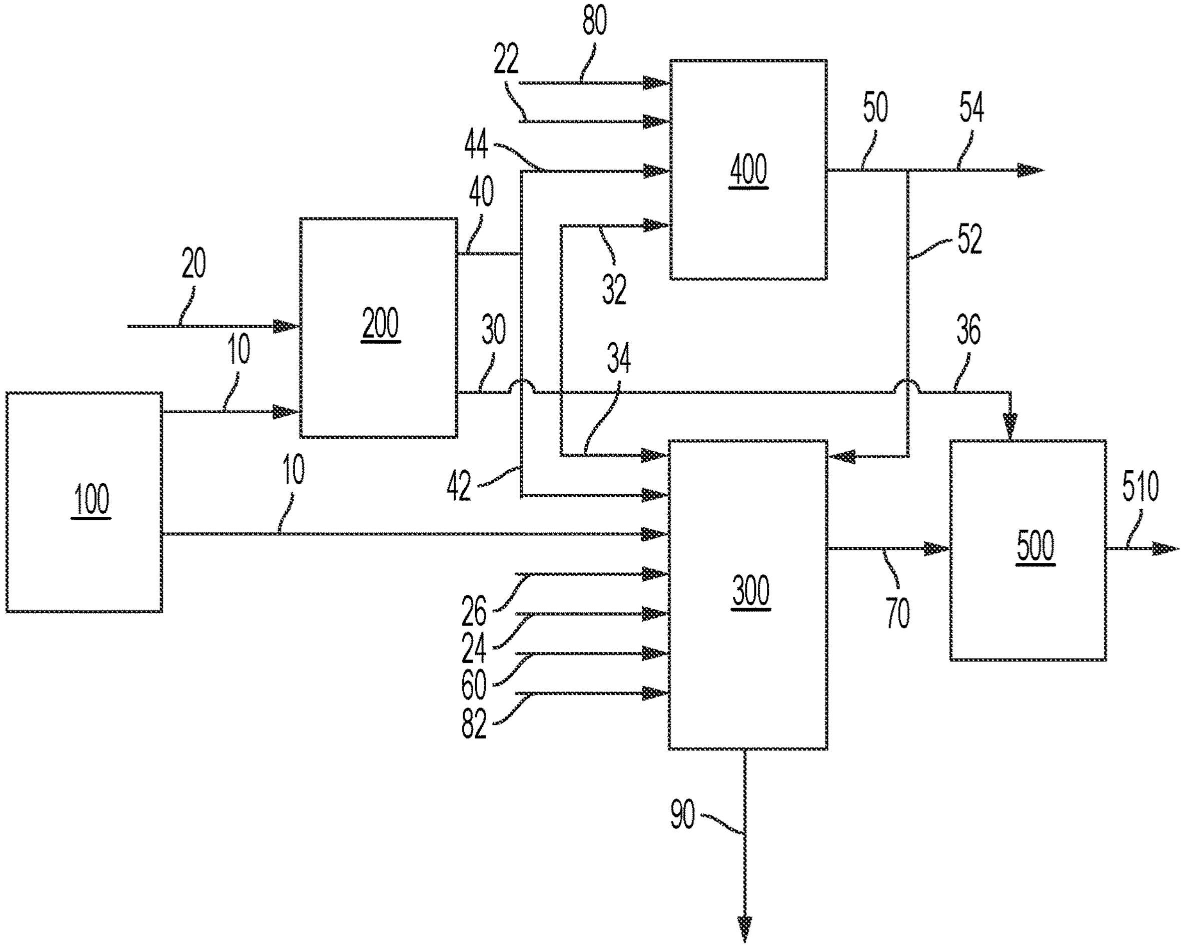
FIG. 3 is a flow chart of an integrated catalyst manufacturing process with provisional of supplemental fuel in accordance with one or more embodiments of the present disclosure.

With reference to FIGS. 1 through 3, the integrated catalyst/adsorbent manufacturing process includes generating electrical energy 10 from a green energy source 100 and providing the electrical energy 10 to an electrolyzer 200 and a catalyst/adsorbent manufacturing unit 300. The process further includes providing a first stream of water 20 to the electrolyzer 200 and operating the electrolyzer 200 with the electrical energy 10 from the green energy source 100 to generate a hydrogen stream 30 and an oxygen stream 40 from electrolysis of the first stream of water 20. The integrated catalyst manufacturing process further includes providing a second stream of water 22 to a steam generation unit 400, providing at least a portion of the hydrogen stream 30/32 generated in the electrolyzer 200 to the steam generation unit 400, and operating the steam generation unit 400 by burning the hydrogen from the hydrogen stream 30/32 in the steam generation unit 400 to generate heat to convert the second stream of water 22 into steam 50. Further, the integrated catalyst/adsorbent manufacturing process includes providing at least a portion of the hydrogen stream 30/34 generated in the electrolyzer 200, at least a portion of the oxygen stream 40/42 generated in the electrolyzer 200, and at least a portion of the steam 50/52 generated in the steam generation unit 400 to the catalyst/adsorbent manufacturing unit 300. Additionally, the process includes providing catalyst/adsorbent precursor chemicals 60 to the catalyst/adsorbent manufacturing unit 300 as well as providing the electrical energy 10 generated from the green energy source 100 to the catalyst/adsorbent manufacturing unit 300 and then operating the catalyst/adsorbent manufacturing unit 300 to produce the catalyst/adsorbent from the electrical energy 10, the steam 52, the hydrogen 34, the oxygen 42, and the catalyst/adsorbent precursor chemicals 60. Finally, integrated catalyst/adsorbent manufacturing process further includes capturing a carbon dioxide stream 70 generated as a by-product of production of the catalyst/adsorbent in the catalyst/adsorbent manufacturing unit 300.

Having generally described the integrated catalyst/adsorbent manufacturing process, the individual process steps and systems will be provided in greater detail in accordance with the various embodiments of the present disclosure.

The integrated catalyst/adsorbent manufacturing process utilizes electrical energy 10 from one or more green energy sources 100. The utilization of green energy allows for production of the catalyst/adsorbent without release of substantial carbon dioxide ($CO_2$) and other pollutants from energy generation using fossil fuels or other non-green energy sources. For purposes of the present disclosure, "green energy" is defined as any energy type that is generated from capture of energy from natural resources. It is noted that green energy resources do not produce direct pollution, such as is found with fossil fuels as green energy resources are utilized without the need for pyrolysis or burning of a hydrocarbon based fuel. Green energy is expressly distinguished from renewable energy as an energy source may be renewable, but not considered green. For example, power generation that burns organic material from sustainable forests may be renewable, but it is not green, due to the $CO_2$ produced by the burning process itself. Green energy or electric sources are usually naturally replenished, as opposed to fossil fuel sources like natural gas or coal, which can take millions of years to develop.

Green energy may be collected from various natural resources and divided into various categories based on the natural resource utilized to capture the green energy. Five common forms of green energy are provided, but it will be appreciated that as technology develops additional types of green energy may be come both technologically and economically feasible. One common type of green energy is solar power. Solar power is typically produced using photovoltaic cells that capture sunlight and turn it into electricity. Solar power is also used to directly capture thermal energy which may be used to generate hot water, steam, or heat other articles. Wind power is another common type of green energy. Wind energy leverages the power of the flow of air around the world to push turbines that then generate electricity. Green energy also encompasses tidal power which is produced by the natural rise and fall of tides caused by the gravitational interaction between earth, the sun, and the moon. Further, hydropower, also commonly called hydroelectric power, is a type of green energy uses the flow of water in rivers, in streams, from reservoirs, or from other bodies of water to drive turbines that then generate electricity. Finally, green energy includes geothermal energy capture. Geothermal energy utilizes thermal energy that has been stored just under the earth's crust. While this resource requires drilling to access it offers an essentially unlimited resource once the collection infrastructure is in place.

The integrated catalyst/adsorbent manufacturing process utilizes the electrical energy 10 from the green energy source 100 to operate the various unit operations included in the integrated catalyst/adsorbent manufacturing process. Specifically, in one or more embodiments, the green energy source 100 provides the energy required for operation of the electrolyzer 200, the catalyst/adsorbent manufacturing unit 300, and the steam generation unit 400.

The integrated catalyst/adsorbent manufacturing process includes an electrolyzer 200 which separates the first stream of water 20 into the hydrogen stream 30 and the oxygen stream 40 for beneficial utilization within the integrated catalyst/adsorbent manufacturing process. Accordingly, the first stream of water 20 is provided to the electrolyzer 200 along with the electrical energy 10 from the green energy source 100.

In one or more embodiments, the integrated catalyst/adsorbent manufacturing process includes an electrolyzer 200 which separates the first stream of water 20 into the hydrogen stream 30 and the oxygen stream 40 through an electrolysis process for beneficial utilization within the integrated catalyst/adsorbent manufacturing process. Specifically, electrolysis of water is the decomposition of water into oxygen and hydrogen gas as a result of an electric current being passed through the water. In practice in the electrolyzer 200, a DC current generated with the electrical energy 10 from the green energy source 100 is connected to two electrodes, or two plates which are placed in the water. The electrodes or plates are typically made from an inert metal such as platinum, stainless steel or iridium. Hydrogen appears at the cathode electrode or plate where electrons enter the water and oxygen appears at the anode electrode or plate. Assuming ideal faradaic efficiency, two mols of hydrogen and one mole of oxygen are generated, and both are proportional to the total electrical charge conducted by the solution. The hydrogen stream 30 and the oxygen stream 40 are provided to one or both of the catalyst/adsorbent manufacturing unit 300 and the stream generation unit 400 as process streams for reaction, combustion, or both. Accordingly, the first stream of water 20 is provided to the electrolyzer 200 along with the electrical energy 10 from the green energy source 100 to generate the hydrogen stream 30 and the oxygen stream 40 without generation of $CO_2$.

In pure water, at the negatively charged cathode, a reduction reaction takes place, with electrons ($e^-$) from the cathode being given to hydrogen cations to form hydrogen gas. The half reaction at the cathode is in accordance with reaction (1).

$$2H^+(aq)+2e^-\rightarrow H_2(g) \quad (1)$$

Similarly, at the positively charged anode, an oxidation reaction occurs, generating oxygen gas and giving electrons to the anode to complete the circuit in accordance with reaction (2).

$$2H_2O(l)\rightarrow O_2(g)+4H^+(aq)+4e^- \quad (2)$$

The overall reaction when the two half reactions are combined produces 2 molecules of hydrogen gas ($H_2$) and one molecule of oxygen gas ($O_2$) from every two molecules of water ($H_2O$) in accordance with reaction (3).

$$2H_2O(l)\rightarrow 2H_2(g)+O_2(g) \quad (3)$$

The electrolysis reaction of water into hydrogen and water has a standard potential of −1.23 V, meaning it ideally requires a potential difference of 1.23 volts to split the water. However, electrolysis of pure water requires excess energy in the form of overpotential to overcome various activation barriers. Without the excess energy, the electrolysis of pure water occurs very slowly or not at all due to the limited self-ionization of water. Electrocatalysts may also be provided to aid in the electrolysis of water into oxygen and hydrogen.

The first stream of water 20 provided to the electrolyzer 200 should be an ultrapure water stream. The purity of the first stream of water 20 is determined based on the conductivity of the first stream of water 20. In one or more embodiments, the first stream of water 20 provided to the electrolyzer 200 should have a measured conductivity of less than 1 microsiemens per centimeter (μS/cm) for standard alkaline electrolyzers. In one or more embodiments, the first stream of water 20 provided to the electrolyzer 200 should have a measured conductivity of less than 0.1 μS/cm for proton exchange membrane (PEM) electrolyzers. A water treatment facility may be provided to supply ultrapure water. Accordingly, the first stream of water 20 may have specifications of conductivity less than 1 μS/cm; hardness less than 0.3 milligrams per liter (mg/l), chlorides less than 0.05 mg/l, sulphates less than 0.05 mg/l; total silica less than 0.01 mg/l; sodium less than 0.05 mg/l; and dissolved oxygen less than 0.007 mg/l.

The integrated catalyst/adsorbent manufacturing process includes a steam generation unit 400. A second steam of water 22 is provided to the steam generation unit 400. The steam generation unit 400 generates steam 50 from the second stream of water 22. Specifically, at least a portion of the hydrogen stream 30/32 generated in the electrolyzer 200 is provided to the steam generation unit 400 where the hydrogen stream 32 is burned to generate heat. The generated heat converts the second steam of water 22 into steam 50 for advantageous utilization within other unit operations of the integrated catalyst/adsorbent manufacturing process. Accordingly, steam 50 is generated by leveraging the hydrogen stream 30 produced by the electrolyzer 200 using green energy 100 without additional generation of $CO_2$.

In one or more embodiments and with reference to FIGS. 1 through 3, at least a portion of the oxygen stream 40/44 generated in the electrolyzer 200 may be provided to the steam generation unit 400. The oxygen stream 40/44 provides a dedicated oxygen source for combustion of the hydrogen stream 30/32 to generate heat to generate the steam 50. In further embodiments, a source of atmospheric air may be provided to the steam generation unit 400 as an oxygen source of combustion of the hydrogen stream 30/32.

In one or more embodiments and with reference to FIG. 3, a supplemental liquid natural gas (LNG) stream 80 may be provided to the steam generation unit 400. The supplemental LNG stream 80 may serve as an additional fuel source to supplement the heat generated from the hydrogen stream 30/32. Specifically, the supplemental LNG stream 80 allows for additional heating to be provided in instances where the hydrogen stream 30/32 is incapable of meeting the dynamic heating demand for steam 50 from the steam generation unit 400. It is noted, that utilization of LNG as a supplemental heating source in the steam generation unit 400 may result in generation of $CO_2$, as well as CO, but the green nature of the integrated catalyst/adsorbent manufacturing process may be maintained as any generated $CO_2$ may be captured in the same manner as $CO_2$ generated in the catalyst/adsorbent manufacturing unit 300 as part of the integrated catalyst/adsorbent manufacturing process. As such, it is noted that in one or more embodiments, petroleum gas and natural gas are expressly not provided to the steam generation unit 400.

In one or more embodiments, steam may be generated in the steam generation unit 400 without the combustion of the hydrogen stream 30/32 generated in the electrolyzer 200 to generate heat for heating an existing water stream. Specifically, hydrogen and oxygen may be combined in a chamber to generate steam from the reaction of hydrogen and oxygen in the presence of water. For example, 36.74 grams of hydrogen reacts with 293.92 grams of oxygen in the presence of 1269.36 grams of water to generate 1600 grams of steam at 450° C.

The integrated catalyst/adsorbent manufacturing process includes a catalyst/adsorbent manufacturing unit 300. The catalyst/adsorbent manufacturing unit 300 produces a catalyst/adsorbent 90. Specifically, at least a portion of the hydrogen stream 30/34 generated in the electrolyzer 200, at least a portion of the oxygen stream 40/42 generated in the electrolyzer 200, at least a portion of the steam 50/52 generated in the steam generation unit 400, and catalyst/adsorbent precursor chemicals 60 are provided as feed streams to the catalyst/adsorbent manufacturing unit 300. Additionally, the electrical energy 10 generated from the green energy source 100 is also provided to the catalyst/adsorbent manufacturing unit 300. Accordingly, the catalyst/adsorbent manufacturing unit 300 is operated leveraging the electrical energy 10, the steam 52, the hydrogen 34, and the oxygen 42 to produce the catalyst/adsorbent 90 from the catalyst/adsorbent precursor chemicals 60. It is noted that operation of the catalyst/adsorbent manufacturing unit 300 with thermal and electrical energy ultimately provided from the green energy source 100 in the form of the electrical energy 10, the steam 52, the hydrogen 34, and the oxygen 42 results in no additional $CO_2$ generation to operate and power the catalyst/adsorbent manufacturing unit 300.

Solid catalyst/adsorbent manufacturing processes may vary considerably based on the specific catalyst/adsorbent 90 type being prepared. For example, in one or more embodiments the catalyst/adsorbent 90 may be a heterogeneous catalyst/adsorbent for fuel refining or petrochemicals production. In various further embodiments, the catalyst/adsorbent 90 may be a hydrocracking catalyst, a catalytic reforming catalyst, a fluid catalytic reforming catalyst, a hydrotreating catalyst, a hydroprocessing catalyst, a hydrogenation catalyst, an isomerization catalyst, an aromatic alkylation catalyst, a transalkylation catalyst, or a metathesis catalyst, as well as various adsorbents. As such, it will be appreciated that the present disclosure is intended to encompass all catalyst/adsorbent manufacturing processes and catalyst/adsorbent formulations known to those skilled in the art.

In one or more embodiments, the catalyst/adsorbent 90 is a hydrotreating catalyst. It will be appreciated that hydrotreating catalysts are typically supported catalysts. The support within the hydrotreating catalyst is usually alumina or a zeolite, which are crystalline silica-alumina oxides. Active phase metals such as Co, Ni, Mo, W may also be impregnated on the support. The active phase metals impregnated may be in oxide form. Examples of hydrotreating catalysts include Ni—Mo on alumina or Co—Mo on alumina or Ni—Co—Mo on alumina. Further, hydrotreating catalysts may be unsupported with metal oxides that are catalytically active precipitated as a solid powder and then converted to a catalyst pellet. Examples of unsupported hydrotreating catalysts include Ni—Mo or Ni—Mo—W or Co—Ni—Mo without an alumina support.

In one or more embodiments, the catalyst/adsorbent 90 is a hydrocracking catalyst. Hydrocracking catalysts are similar to hydrotreating catalyst, but the support material may be alumina, amorphous and/or crystalline (zeolite) silica-alumina. Further, active phase metals impregnated within the support material may be the same as disclosed for hydrotreating catalysts. An example of a hydrocracking catalyst is Ni-Mo+USY zeolite+binder alumina.

In one or more embodiments, the catalyst/adsorbent 90 is a catalytic reforming catalyst. Catalytic reforming catalysts are typically supported catalysts. An example of a catalytic reforming catalyst is a bimetallic reforming catalysts which is composed of platinum and a second metal, typically rhenium, tin, germanium, or iridium, supported on chlorinated alumina. Further example catalytic reforming catalysts include Pt on Alumina, and Pt—Pd on alumina and chloride.

In one or more embodiments, the catalyst/adsorbent 90 is a fluid catalytic cracking catalyst. Fluid catalytic cracking catalysts are usually composed of a zeolite, a binder, a filler, and an active alumina component, such as kaolin. Fluid catalytic cracking catalysts typically do not include any metals for hydrogenation, but rare earth metals may be added to enhance performance. The zeolite is usually Y zeolite. The Y zeolite may be modified with other metals using post modification techniques. The metals can be in the framework or on the surface. MFI type zeolite may also be used as a catalyst additive.

It will be appreciated that the catalyst/adsorbent 90 may be any catalyst/adsorbent 90 used throughout the petrochemical industries. Catalyst/adsorbents used in petrochemical industries are based on zeolite (crystalline silica alumina). The zeolites have FAU, MFI, MOR, BEA frameworks.

The present disclosure advances existing manufacturing processes with the provision of green oxygen and hydrogen generated by the electrolyzer 200 with electrical energy 10 from the green energy source 100 as well as provision of electrical energy 10 from the green energy source 100 directly to the catalyst/adsorbent manufacturing unit 300 to drastically diminish generation of $CO_2$ in the catalyst/adsorbent manufacturing process. However, for the sake of completeness and to demonstrate selected embodiments of the integrated catalyst/adsorbent manufacturing process specific catalyst/adsorbent manufacturing procedures and formulations are provided.

In one or more embodiments, operating the catalyst/adsorbent manufacturing unit 300 to produce the catalyst/adsorbent 90 comprises generating a catalyst/adsorbent precursor, the catalyst/adsorbent precursor comprising zeolite, binder, active materials, or combinations thereof and then calcining the catalyst/adsorbent precursor. Specifically, manufacturing or processing steps to form the catalyst/adsorbent 90 within the catalyst/adsorbent manufacturing unit 300 may include precipitation, hydrothermal transformation, decantation, filtration, centrifugation, washing, drying, crushing and grinding, sieving, kneading or mulling, and forming operations to generate the catalyst/adsorbent precursor. In one or more embodiments, generating the catalyst/adsorbent precursor comprises mixing a solution or suspension of the catalyst/adsorbent precursor chemicals 60 to generate a precipitate and then forming particles of the catalyst/adsorbent precursor. Specifically, precipitation involves the mixing of solutions or suspension of materials, resulting in the formation of a precipitate, which may be crystalline or amorphous. Kneading or mulling of the generated precipitate may form a dough that may be subsequently formed and dried forming the catalyst/adsorbent precursor.

The catalyst/adsorbents 90 include a support which form the bulk of the catalyst/adsorbent 90 particles. The support provides a scaffold upon which to add active materials. The support characteristics determine the mechanical properties of the catalyst/adsorbent, such as attrition resistance, hardness, and crushing strength. High surface area and proper pore-size distribution are typical of many catalyst/adsorbents 90. The pore-size distribution and other physical properties of a catalyst/adsorbent support prepared by precipitation are also affected by the precipitation and the aging conditions of the precipitate as well as by subsequent drying and forming.

While the specific catalyst/adsorbent precursor chemicals 60 required to form the catalyst/adsorbent 90 are dependent on the particular type of catalyst/adsorbent 90 formed, some examples of the catalyst/adsorbent precursor chemicals 60 which may be provided to the catalyst/adsorbent manufacturing unit 300 are provided. For purposes of this disclosure the term “catalyst/adsorbent precursor chemicals” includes all the chemical feeds included as part of a formulation to generate a catalyst/adsorbent. The catalyst/adsorbent precursor chemicals 60 include the basic chemicals to prepare the support such as titanium sulfate, zirconium (iv) sulfate tetrahydrate, ammonium dicarbonate, carboxymethylcellulose, malic acid, powdered glutinous rice, pure water, sodium aluminate, sodium gluconate, sodium silicate; metal complexes for active phase metals such as molybdenum (vi) oxide, nickel carbonate; and other chemicals including acids and bases such as ammonia solution, caustic soda, sulfuric acid that are desirable for the various reactions involved in forming the catalyst/adsorbents 90.

The catalyst/adsorbent precursor may be processed into a size and shape as desired. The final shape and size of catalyst/adsorbent particles are determined in the forming step. The catalyst/adsorbent precursors may be formed into several possible shapes such as spheres, cylindrical extrudates, shaped forms such as a trilobes, quadrilobes, and honeycombs, as well as spray dried powder. Spherical catalyst/adsorbent precursors can be obtained by “oil dropping,” whereby precipitation occurs upon the pouring of a liquid into a second immiscible liquid. Other spherical processes include marmurizing. Non spherical shapes are obtained by mixing raw materials to form an extrudable dough which is extruded through a die with perforations. The elongated extrudate pressed from the die is dried and broken into short pieces after calcining. The length to diameter ratio of the catalyst/adsorbent precursor and ultimately formed catalyst/adsorbent 90 varies and may be between 2 and 4 in one or more embodiments.

In the forming steps, typically inert materials are used as binders. Such binder materials are used to increase the post-compression adhesion, and facilitate forming the catalyst/adsorbent precursor into a desired form. Further, in one or more embodiments, a peptization agent may be added to deagglomerate the particles when forming particles of the catalyst/adsorbent precursor. In various embodiments, the peptization agent may be hydrochloric acid, sulfuric acid, nitric acid, acetic acid, sulfonic or other acids with pH less than 7.

In one or more embodiments operating the catalyst/adsorbent manufacturing unit 300 to produce the catalyst/adsorbent 90 further comprises impregnating the catalyst/adsorbent precursor with a metal or metal oxide to generate a metal impregnated catalyst/adsorbent precursor. Specifically, catalytically active materials such as metal or metal oxides may be impregnated on the surface of, within the pores of, or both on the surface and in the pores of the bulk catalyst/adsorbent particles.

The formed particles of the catalyst/adsorbent precursor can then be subjected to thermal treatment such as calcination. Thermal treatment or calcining of the catalyst/adsorbent precursor achieves more intimate contact between components of the catalyst/adsorbent 90 and better homogeneity within the formed catalyst/adsorbent 90 by thermal diffusion and solid-state reactions. Further, in in embodiments which include impregnating the catalyst/adsorbent precursor with a metal or metal oxide to generate a metal impregnated catalyst/adsorbent precursor, the catalyst/adsorbent precursor may be subjected to thermal treatment prior to impregnating the catalyst/adsorbent precursor with the metal or metal oxide.

In one or more embodiments, the hydrogen stream 30/34 generated in the electrolyzer 200 is burned to generate heat in the catalyst/adsorbent manufacturing unit 300. The generated heat may be utilized for calcining the catalyst/adsorbent precursor. Leveraging the hydrogen stream 30/34 generated in the electrolyzer 200 to generate heat in the catalyst/adsorbent manufacturing unit 300 reduces or eliminates the need for alternative fuels, such as the burning of fossil fuels, to complete the calcining or other heating operations in the catalyst/adsorbent manufacturing unit 300. It will be appreciated that such arrangement allows the catalyst/adsorbent manufacturing unit 300 to be operated without generating $CO_2$ in the production of energy to operate the catalyst/adsorbent manufacturing unit 300.

In one or more embodiments and with reference to FIG. 3, a supplemental fuel stream 82 may be provided to the catalyst/adsorbent manufacturing unit 300. The supplemental fuel stream 82 may comprises LNG or other fuel and may serve as an additional fuel source to supplement the heat generated from the hydrogen stream 30/334. Specifically, the supplemental fuel stream 82 allows for additional heating to be provided in instances where the hydrogen stream 30/34 is incapable of meeting the dynamic heating demands of the catalyst/adsorbent manufacturing unit 300. It is noted, that utilization of LNG or other fuel as a supplemental heating source in the catalyst/adsorbent manufacturing unit 300 may result in generation of $CO_2$, as well as CO, but the green nature of the integrated catalyst/adsorbent manufacturing process may be maintained as any generated $CO_2$ may be captured in the same manner as other $CO_2$ generated in the catalyst/adsorbent manufacturing unit 300 as part of the integrated catalyst/adsorbent manufacturing process. As such, it is noted that in one or more embodiments, petroleum gas and natural gas are expressly not provided to the catalyst/adsorbent manufacturing unit 300.

In one or more embodiments, the oxygen stream 40/42 generated in the electrolyzer 200 may be provided as a gas flow when calcining the catalyst/adsorbent precursor or the metal impregnated catalyst/adsorbent precursor to produce a concentrated carbon dioxide flue gas. In various embodiments, the concentrated carbon dioxide flue gas may have a carbon dioxide concentration of at least 99% by volume.

In one or more embodiments, a cooling water stream 24, a third stream of water 26, or both may be provided to the catalyst/adsorbent manufacturing unit 300. It will be appreciated that the cooling water stream 24 provides temperature control to the various processing steps included within the catalyst/adsorbent manufacturing unit 300. For example, upon competition of the calcining of the catalyst/adsorbent precursor it may be desirable to quickly quench the elevated temperature which may be achieved with the cooling water stream 24. Further, the third stream of water 26 may be provided to provide a source of water for mixing with the catalyst/adsorbent precursor chemicals 60 to during formulation and generation of the catalyst/adsorbents 90 within the catalyst/adsorbent manufacturing unit 300. The third stream of water 26 may be deionized or purified water.

The generation of the catalyst/adsorbent 90 within the catalyst/adsorbent manufacturing unit 300 produces carbon dioxide stream 70 as a by-product amongst other by-products. Specifically, the catalyst/adsorbent manufacturing unit 300 generates three types of by-products: gas, liquid, solid. For the sake of simplicity, the provided figures only include streams exiting the catalyst/adsorbent manufacturing unit 300 representing the catalyst/adsorbent 90 and carbon dioxide stream 70, but it will be appreciated that the remaining by-products similarly are provided as effluent via appropriate streams from the catalyst/adsorbent manufacturing unit 300. The additional gas by-products may include $SO_X$, NOx and other hydrocarbon gases such as methane, ethane, and ethylene resulting from catalyst/adsorbent calcination, zeolite syntheses or fuel burning or leakage. The liquid by-products may include inorganic acids such as $H_2SO_4$, HF, or $HNO_3$, salts of cobalt, nickel, and molybdenum, as well as ammonium chloride and aluminum sulfate. The solid by-products may include suspended matter at a rate of approximately 200 to 900 mg/liter as well as salts such as sulfates, chlorides, and salts of silicic acid and aluminum.

As carbon dioxide is generated within the catalyst/adsorbent manufacturing unit 300, efforts are made in accordance with the present disclosure to eliminate or minimize release of such carbon dioxide back into the atmosphere. Specifically, to maintain the environmental conscious and green catalyst/adsorbent manufacturing process in accordance with the present disclosure, carbon dioxide stream 70 generated within the catalyst/adsorbent manufacturing unit 300 is not vented and released. Accordingly, in the integrated catalyst/adsorbent manufacturing process includes capturing carbon dioxide stream 70 generated as a by-product of production of the catalyst/adsorbent 90 in the catalyst/adsorbent manufacturing unit.

In one or more embodiments and with reference to FIG. 1, the carbon dioxide steam stream 70 generated as a by-product of production of the catalyst/adsorbent 90 in the catalyst/adsorbent manufacturing unit 300 is sequestered underground. For example, the carbon dioxide stream 70 may be stored within voids generated underground where oil was previously recovered. Such operation sequesters the carbon dioxide 70, and notably sequesters the carbon dioxide 70 within a volume previously occupied by a carbonaceous fuel. In one or more embodiments carbon dioxide generated from utilization of the supplemental LNG stream 80 in the steam generation unit 400 or utilization of the supplemental fuel stream 82 in the catalyst/adsorbent manufacturing unit 300 may be combined with the carbon dioxide steam stream 70 generated as a by-product of production of the catalyst/adsorbent 90 in the catalyst/adsorbent manufacturing unit 300 for sequestration underground.

In one or more embodiments and with reference to FIGS. 2 and 3, the carbon dioxide stream 70 generated as a by-product of production of the catalyst/adsorbent 90 in the catalyst/adsorbent manufacturing unit 300 is passed to a carbon dioxide conversion system 500 where the carbon dioxide 70 is converted to value-added chemicals 510. According to one or more embodiments, within the carbon dioxide conversion system 500 the carbon dioxide stream 70 generated as a by-product of production of the catalyst/adsorbent 90 in the catalyst/adsorbent manufacturing unit 300 is converted to syngas comprising carbon monoxide and hydrogen gas through a reverse gas shift reaction. According to one or more embodiments the syngas may be further processed into oxygenates including alcohols or ethers. Further, according to one or more embodiments the syngas may be further converted to synthetic fuels. Similarly, according to one or more embodiments the alcohols and ethers may be converted to synthetic fuels. In one or more embodiments carbon dioxide generated from utilization of the supplemental LNG stream 80 in the steam generation unit 400 or utilization of the supplemental fuel stream 82 in the catalyst/adsorbent manufacturing unit 300 may be combined with the carbon dioxide steam stream 70 generated as a by-product of production of the catalyst/adsorbent 90 in the catalyst/adsorbent manufacturing unit 300 for conversion to the value-added chemicals 510 including syngas, oxygenates, synthetic fuels, or combinations thereof.

The carbon dioxide conversion system 500 performs the actual conversion of the $CO_2$ collected from the other unit operations, including the catalyst/adsorbent manufacturing unit 300, of the integrated catalyst/adsorbent manufacturing process. The carbon dioxide conversion system 500 operates in accordance with any known chemical conversion of $CO_2$ to value-added chemicals 510 including liquid fuels or fuel additives known to one skilled in the art. In one or more embodiments, the $CO_2$ is converted to fuels and fuel additives leveraging a portion of the hydrogen 30/36 generated in the electrolyzer 200. The hydrogen 30/36 and the carbon dioxide 70 are provided as feeds to the carbon dioxide conversion system 500 to produce various value-added chemicals 510 including fuels and fuel additives. Systems and processes for converting $H_2$ and $CO_2$ to useful fuels are known to those skilled in the art. Any known process for converting $H_2$ and $CO_2$ to useful fuels may be utilized in the carbon dioxide conversion system 500 for on-site conversion of carbon dioxide to liquid fuels and fuel additives of the present disclosure.

The carbon dioxide conversion system 500 may utilize a $CO_2$ conversion catalyst to drive the electrochemical reduction of the $CO_2$ 70 to the value-added chemicals 510 including liquid fuels and fuel additives. In various embodiments, the $CO_2$ conversion catalyst used for the electrochemical reduction of $CO_2$ include metal macrocycles such as Ni(I) and Ni(II) macrocycles, Co(I) tetraaza macrocycles, Pd complexes, Ru(II) complexes, and Cu(II) complexes. To produce an organic peroxide, a $CO_2$ conversion catalyst such as N-Hydroxyphthalimide may be utilized. To produce an alcohol or aldehyde, a two catalyst system such as N-Hydroxyphthalimide and Cobalt or similar metal may be utilized.

Accordingly, in one or more embodiments, the integrated catalyst/adsorbent manufacturing process generates no carbon dioxide emissions.

Examples

Figure 4:
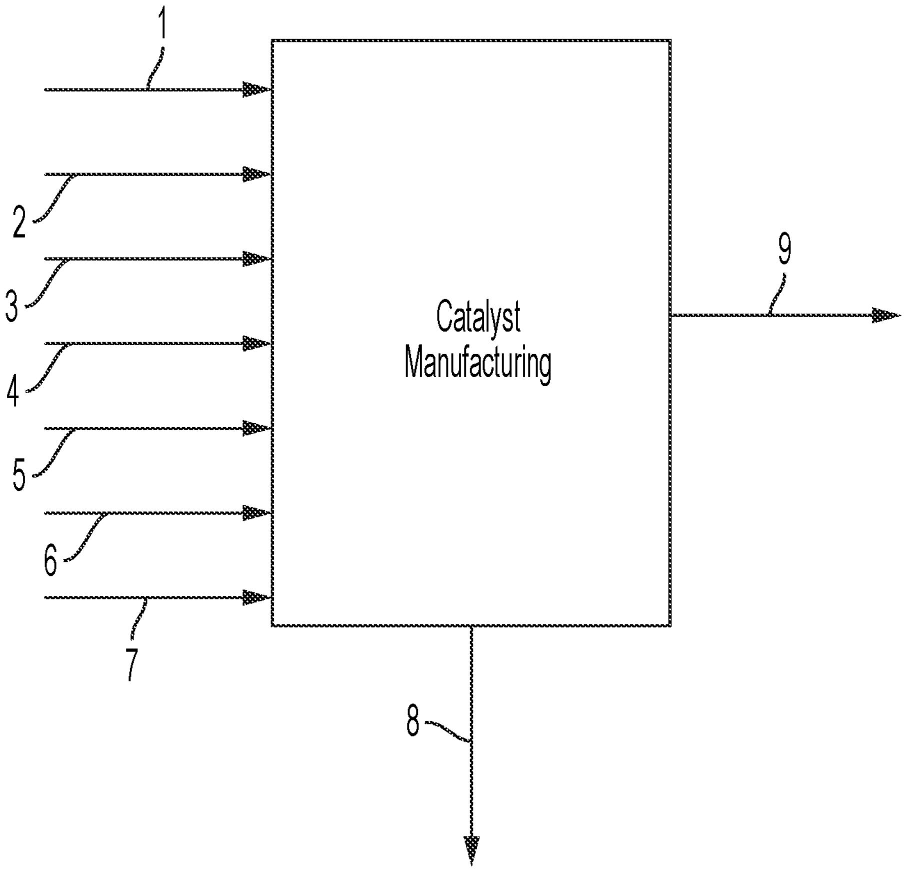
FIG. 4 is a flowchart of a typical existing catalyst manufacturing process.

A simulation was prepared to determine materials and utilities required for preparation of the catalyst/adsorbent 90 according to traditional methods where LNG is utilized for heating. FIG. 4 provides such a system according to traditional production methods. Further, Table 1 provides inputs and outputs of selected streams as illustrated in FIG. 4 for production of 1,000 kg of hydrocracking catalyst. As indicated in Table 1, 1,239 kg of $CO_2$ is released to the atmosphere for 1,000 kg of catalyst production not including any $CO_2$ production resulting from electricity generation and oxygen production. Such $CO_2$ production is based solely upon the LNG consumed (667 kg) to produce the 1,000 kg of catalyst and does not account for $CO_2$ produced to generate electricity or produce feed streams.

TABLE 1

| Stream # (in FIG. 4) | Stream Name | Unit | Value |
|---|---|---|---|
| 1 | Pure Water | $m^3$ | 133 |
| 2 | Oxygen | $m^3$ | 277 |
| 3 | Electricity | MWH | 3 |
| 4 | Steam | Kg | 15,000 |
| 5 | Natural Gas | $m^3$ | 667 |
| 6 | Cooling water | Kg | 333 |
| 7 | Catalyst Precursor Chemicals | Kg | 7,398 |
| 8 | Catalyst | Kg | 1,000 |
| 9 | $CO_2$ | Kg | 6,789 |

For comparison, a substantially similar simulation was prepared for integrated catalyst/adsorbent manufacturing process according to the present disclosure. Specifically, determination was made of materials and utilities required for preparation of 1,000 kg of the catalyst 90 according to the present disclosure. That is materials and utility demands were determined for a system with the green energy source 100 utilized to provide electrical energy 10 as well as inclusion of the electrolyzer 200 and steam generation unit 400 powered by the green energy source 100 to provide the oxygen stream 40 and the hydrogen stream 30. Table 2 provides inputs and outputs of selected streams as illustrated in FIG. 1 for production of 1,000 kg of hydrocracking catalyst.

TABLE 2

| Stream # | Stream Name | Unit | Value |
|---|---|---|---|
| 26 | Third stream of water | $m^3$ | 133 |
| 42 | Oxygen to catalyst manufacturing unit | $m^3$ | 277 |
| 10 | Electrical energy to catalyst manufacturing unit | MWH | 3 |
| 52 | Steam to catalyst manufacturing unit | Kg | 15,000 |
| 34 | Hydrogen to catalyst manufacturing unit | Kg | 5,763 |
| 24 | Cooling water to catalyst manufacturing unit | Kg | 333 |
| 60 | Catalyst precursor chemicals | Kg | 7,398 |
| 90 | Catalyst | Kg | 1,000 |
| 70 | $CO_2$ | Kg | 0 |
| 20 | First stream of water to electrolyzer | Kg | 51,456 |
| 10 | Electrical energy to electrolyzer | Kg | 2,830 |
| 30 | Hydrogen from electrolyzer | Kg | 6,107 |

TABLE 2-continued

| Stream # | Stream Name | Unit | Value |
|---|---|---|---|
| 40 | Oxygen from electrolyzer | Kg | 48,422 |
| 44 | Oxygen to Steam Generator | Kg | 2,755 |
| 22 | Second stream of water to steam generator | Kg | 11,900 |
| 32 | Hydrogen to steam generator | Kg | 344 |
| 50 | Steam total | Kg | 15,000 |
| 54 | Steam surplus | Kg | 0 |

It should now be understood that various aspects of the integrated catalyst/adsorbent manufacturing process are described and such aspects may be utilized in conjunction with various other aspects.

In a first aspect, the disclosure provides an integrated catalyst/adsorbent manufacturing process. The process comprises generating electrical energy from a green energy source; providing a first stream of water to an electrolyzer; providing the electrical energy generated from the green energy source to the electrolyzer; operating the electrolyzer to generate a hydrogen stream and an oxygen stream from electrolysis of the first stream of water; providing a second stream of water to a steam generation unit; providing at least a portion of the hydrogen stream generated in the electrolyzer to the steam generation unit; operating the steam generation unit by burning the hydrogen in the steam generation unit to generate heat to convert the second stream of water into steam; providing at least a portion of the hydrogen stream generated in the electrolyzer, at least a portion of the oxygen stream generated in the electrolyzer, and at least a portion of the steam generated in the steam generation unit to a catalyst/adsorbent manufacturing unit; providing catalyst/adsorbent precursor chemicals to the catalyst/adsorbent manufacturing unit; providing the electrical energy generated from the green energy source to the catalyst/adsorbent manufacturing unit; operating the catalyst/adsorbent manufacturing unit to produce the catalyst/adsorbent from the electrical energy, the steam, the hydrogen, the oxygen, and the catalyst/adsorbent precursor chemicals; and capturing a carbon dioxide stream generated as a by-product of production of the catalyst/adsorbent in the catalyst/adsorbent manufacturing unit.

In a second aspect, the disclosure provides the process of the first aspect, in which the green energy source is selected from the group consisting of solar energy, wind energy, geothermal energy, hydropower, or tidal energy.

In a third aspect, the disclosure provides the process of the first or second aspects, in which the carbon dioxide steam stream generated as a by-product of production of the catalyst/adsorbent in the catalyst/adsorbent manufacturing unit is sequestered underground.

In a fourth aspect, the disclosure provides the process of any of the first through third aspects, in which the carbon dioxide stream generated as a by-product of production of the catalyst/adsorbent in the catalyst/adsorbent manufacturing unit is converted to syngas comprising carbon monoxide and hydrogen gas through a reverse gas shift reaction.

In a fifth aspect, the disclosure provides the process of the fourth aspect, in which the syngas is further processed into oxygenates including alcohols or ethers.

In a sixth aspect, the disclosure provides the process of the fourth aspect, in which the syngas is converted to synthetic fuels.

In a seventh aspect, the disclosure provides the process of the fifth aspect, in which the alcohols and ethers are converted to synthetic fuels In an eighth aspect, the disclosure provides the process of any of the first through seventh aspects, in which operating the catalyst/adsorbent manufacturing unit to produce a catalyst/adsorbent comprises generating a catalyst/adsorbent precursor, the catalyst/adsorbent precursor comprising zeolite, binder, active materials, or combinations thereof; and calcining the catalyst/adsorbent precursor.

In a ninth aspect, the disclosure provides the process of the eighth aspect, in which operating the catalyst/adsorbent manufacturing unit to produce a catalyst/adsorbent further comprises impregnating the catalyst/adsorbent precursor with a metal or metal oxide to generate a metal impregnated catalyst/adsorbent precursor; and calcining the metal impregnated catalyst/adsorbent precursor.

In a tenth aspect, the disclosure provides the process of the ninth aspect, in which the catalyst/adsorbent precursor is subjected to thermal treatment prior to impregnating the catalyst/adsorbent precursor with a metal or metal oxide.

In an eleventh aspect, the disclosure provides the process of any of the eighth through tenth aspects, in which generating the catalyst/adsorbent precursor comprises mixing a solution or suspension of the catalyst/adsorbent precursor chemicals to generate a precipitate; and forming particles of the catalyst/adsorbent precursor.

In a twelfth aspect, the disclosure provides the process of any of the eighth through eleventh aspects, in which a peptization agent is added to deagglomerate the particles when forming particles of the catalyst/adsorbent precursor.

In a thirteenth aspect, the disclosure provides the process of the twelfth aspect, in which the peptization agent is hydrochloric acid, sulfuric acid, nitric acid, sulfonic acid or acetic acid.

In a fourteenth aspect, the disclosure provides the process of any of the first through thirteenths aspects, in which the hydrogen stream generated in the electrolyzer is burned to generate heat in the catalyst/adsorbent manufacturing unit.

In a fifteenth aspect, the disclosure provides the process of the ninth aspect, in which the oxygen stream generated in the electrolyzer is provided as a gas flow when calcining the metal impregnated catalyst/adsorbent precursor to produce a concentrated carbon dioxide flue gas having a carbon dioxide concentration of at least 99% by volume.

In a sixteenth aspect, the disclosure provides the process of the eighth aspect, in which the oxygen stream generated in the electrolyzer is provided as a gas flow when calcining the catalyst/adsorbent precursor to produce a concentrated carbon dioxide flue gas having a carbon dioxide concentration of at least 99% by volume.

In a seventeenth aspect, the disclosure provides the process of any of the first through sixteenth aspects, in which the catalyst/adsorbent is a heterogeneous catalyst/adsorbent for fuel refining or petrochemicals production.

In an eighteenth aspect, the disclosure provides the process of any of the first through sixteenth aspects, in which the catalyst/adsorbent is a hydrocracking catalyst, a catalytic reforming catalyst, a fluid catalytic reforming catalyst, a hydrotreating catalyst, a hydroprocessing catalyst, a hydrogenation catalyst, an isomerization catalyst, an aromatic alkylation catalyst, a transalkylation catalyst, or a metathesis catalyst.

In a nineteenth aspect, the disclosure provides the process of any of the first through eighteenth aspects, in which petroleum gas and natural gas are not provided to the steam generation unit.

In a twentieth aspect, the disclosure provides the process of any of the first through nineteenth aspects, in which petroleum gas and natural gas are not provided to the catalyst/adsorbent manufacturing unit In a twenty-first aspect, the disclosure provides the process of any of the first through twentieth aspects, in which the process generates no carbon dioxide emissions.

It should be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure of the claimed subject matter and should be interpreted in like manner as the more commonly used open-ended preamble term "comprising."

What is claimed is:

1. An integrated catalyst/adsorbent manufacturing process, the process comprising:

generating electrical energy from a green energy source;

providing a first stream of water to an electrolyzer;

providing the electrical energy generated from the green energy source to the electrolyzer;

operating the electrolyzer to generate a hydrogen stream and an oxygen stream from electrolysis of the first stream of water;

providing a second stream of water to a steam generation unit;

providing at least a portion of the hydrogen stream generated in the electrolyzer to the steam generation unit;

operating the steam generation unit by burning the hydrogen in the steam generation unit to generate heat to convert the second stream of water into steam;

providing at least a portion of the hydrogen stream generated in the electrolyzer, at least a portion of the oxygen stream generated in the electrolyzer, and at least a portion of the steam generated in the steam generation unit to a catalyst/adsorbent manufacturing unit;

providing catalyst/adsorbent precursor chemicals to the catalyst/adsorbent manufacturing unit;

providing the electrical energy generated from the green energy source to the catalyst/adsorbent manufacturing unit;

operating the catalyst/adsorbent manufacturing unit to produce the catalyst from the electrical energy, the steam, the hydrogen, the oxygen, and the catalyst/adsorbent precursor chemicals; and capturing a carbon dioxide stream generated as a by-product of production of the catalyst/adsorbent in the catalyst/adsorbent manufacturing unit.

2. The integrated catalyst/adsorbent manufacturing process of claim 1, wherein the green energy source is selected from the group consisting of solar energy, wind energy, geothermal energy, hydropower, or tidal energy.

3. The integrated catalyst/adsorbent manufacturing process of claim 1, wherein the carbon dioxide steam stream generated as a by-product of production of the catalyst/adsorbent in the catalyst/adsorbent manufacturing unit is sequestered underground.

4. The integrated catalyst/adsorbent manufacturing process of claim 1, wherein the carbon dioxide stream generated as a by-product of production of the catalyst/adsorbent in the catalyst/adsorbent manufacturing unit is converted to syngas comprising carbon monoxide and hydrogen gas through a reverse gas shift reaction.

5. The integrated catalyst/adsorbent manufacturing process of claim 4, wherein the syngas is further processed into oxygenates including alcohols or ethers.

6. The integrated catalyst/adsorbent manufacturing process of claim 4, wherein the syngas is converted to synthetic fuels.

7. The integrated catalyst/adsorbent manufacturing process of claim 5, wherein the alcohols and ethers are converted to synthetic fuels.

8. The integrated catalyst/adsorbent manufacturing process of claim 1, wherein operating the catalyst/adsorbent manufacturing unit to produce a catalyst/adsorbent comprises:

generating a catalyst/adsorbent precursor, the catalyst/adsorbent precursor comprising zeolite, binder, active materials, or combinations thereof; and calcining the catalyst/adsorbent precursor.

9. The integrated catalyst/adsorbent manufacturing process of claim 8, wherein operating the catalyst/adsorbent manufacturing unit to produce a catalyst/adsorbent further comprises impregnating the catalyst/adsorbent precursor with a metal or metal oxide to generate a metal impregnated catalyst/adsorbent precursor; and calcining the metal impregnated catalyst/adsorbent precursor.

10. The integrated catalyst/adsorbent manufacturing process of claim 9, wherein the catalyst/adsorbent precursor is subjected to thermal treatment prior to impregnating the catalyst/adsorbent precursor with a metal or metal oxide.

11. The integrated catalyst/adsorbent manufacturing process of claim 8, wherein generating the catalyst/adsorbent precursor comprises:

mixing a solution or suspension of the catalyst/adsorbent precursor chemicals to generate a precipitate; and forming particles of the catalyst/adsorbent precursor.

12. The integrated catalyst/adsorbent manufacturing process of claim 11, wherein a peptization agent is added to deagglomerate the particles when forming particles of the catalyst/adsorbent precursor.

13. The integrated catalyst/adsorbent manufacturing process of claim 12, wherein the peptization agent is hydrochloric acid, sulfuric acid, nitric acid, sulfonic acid, or acetic acid.

14. The integrated catalyst/adsorbent manufacturing process of claim 1, wherein the hydrogen stream generated in the electrolyzer is burned to generate heat in the catalyst/adsorbent manufacturing unit.

15. The integrated catalyst/adsorbent manufacturing process of claim 9, wherein the oxygen stream generated in the electrolyzer is provided as a gas flow when calcining the metal impregnated catalyst/adsorbent precursor to produce a concentrated carbon dioxide flue gas having a carbon dioxide concentration of at least 99% by volume.

16. The integrated catalyst/adsorbent manufacturing process of claim 1, wherein the catalyst/adsorbent is a heterogeneous catalyst/adsorbent for fuel refining or petrochemicals production.

17. The integrated catalyst/adsorbent manufacturing process of claim 1, wherein the catalyst is a hydrocracking catalyst, a catalytic reforming catalyst, a fluid catalytic reforming catalyst, a hydrotreating catalyst, a hydroprocessing catalyst, a hydrogenation catalyst, an isomerization catalyst, an aromatic alkylation catalyst, a transalkylation catalyst, or a metathesis catalyst.

18. The integrated catalyst/adsorbent manufacturing process of claim 1, wherein petroleum gas and natural gas are not provided to the steam generation unit.

19. The integrated catalyst/adsorbent manufacturing process of claim 1, wherein petroleum gas and natural gas are not provided to the catalyst/adsorbent manufacturing unit.

20. The integrated catalyst/adsorbent manufacturing process of claim 1, wherein the process generates no carbon dioxide emissions.

* * * * *